United States Patent
Lee et al.

(10) Patent No.: US 12,007,048 B2
(45) Date of Patent: Jun. 11, 2024

(54) COUPLING ASSEMBLY FOR CONNECTING PIPES, AND MANUFACTURING METHOD THEREFOR

(71) Applicant: New Asiajoint Co., Ltd., Yeoju-si (KR)

(72) Inventors: Sang Heon Lee, Seoul (KR); Dong Il Han, Yeoju-si (KR)

(73) Assignee: New Asiajoint Co., Ltd., Yeoju-si (KR)

( * ) Notice: Subject to any disclaimer, the term of this patent is extended or adjusted under 35 U.S.C. 154(b) by 158 days.

(21) Appl. No.: 17/626,736

(22) PCT Filed: Jun. 23, 2020

(86) PCT No.: PCT/KR2020/008181
§ 371 (c)(1),
(2) Date: Jan. 12, 2022

(87) PCT Pub. No.: WO2021/010610
PCT Pub. Date: Jan. 21, 2021

(65) Prior Publication Data
US 2022/0282810 A1    Sep. 8, 2022

(30) Foreign Application Priority Data
Jul. 18, 2019 (KR) .......................... 10-2019-0086980

(51) Int. Cl.
*F16L 23/08* (2006.01)
*F16L 23/22* (2006.01)

(52) U.S. Cl.
CPC .............. *F16L 23/08* (2013.01); *F16L 23/22* (2013.01)

(58) Field of Classification Search
CPC .......... F16L 21/065; F16L 17/04; F16L 23/08
See application file for complete search history.

(56) References Cited

U.S. PATENT DOCUMENTS 9,182,058 B2 * 11/2015 Cygler, III .............. F16L 17/04
9,435,469 B2 * 9/2016 Bancroft .................. F16L 17/04
(Continued)

FOREIGN PATENT DOCUMENTS

CN       101245883 A    8/2008
CN       103270359 A    8/2013
(Continued)

OTHER PUBLICATIONS

Office Action in corresponding Chinese Application No. 202080050002.5. dated Jan. 3, 2023.
(Continued)

*Primary Examiner* — Zachary T Dragicevich
(74) *Attorney, Agent, or Firm* — Knobbe, Martens, Olson & Bear, LLP (57) ABSTRACT

A coupling assembly for connecting pipes includes two or more couplers which are arranged facing each other in order to connect pipes continuously disposed in the axial direction, and the pipes are connected to each other in a state in which coupling members are temporarily assembled to the plurality of couplers. The couplers have catch parts which are inserted into coupling grooves formed in the pipes and have inner diameters corresponding to the outer diameters of the coupling grooves. Interference preventing grooves are formed in both sides of the catch parts and prevent interference between the pipes and the catch parts to allow the outer circumferential surfaces of the pipes to pass through between the temporarily assembled couplers.

8 Claims, 8 Drawing Sheets

(56) References Cited

U.S. PATENT DOCUMENTS

| | | | |
|---|---|---|---|
| 2005/0253382 A1 | 11/2005 | Gibb et al. | |
| 2013/0125373 A1* | 5/2013 | Bancroft | F16L 21/065 |
| 2017/0184226 A1* | 6/2017 | Cuvo | F16L 17/04 |
| 2018/0216754 A1* | 8/2018 | Ciasulli | F16L 23/08 |
| 2018/0347732 A1* | 12/2018 | Kang | F16L 17/04 |

FOREIGN PATENT DOCUMENTS

| | | |
|---|---|---|
| CN | 107893883 A | 4/2018 |
| CN | 109219718 A | 1/2019 |
| DE | 4317591 C1 | 5/1994 |
| JP | 2015-531460 A | 11/2015 |
| JP | 2018-530714 A | 10/2018 |
| JP | 2022-534199 A | 7/2022 |
| KR | 20-0274908 Y1 | 5/2002 |
| KR | 10-2007-0012723 A | 1/2007 |
| KR | 10-2014-0008321 A | 1/2014 |
| KR | 10-2015-0051990 A | 5/2015 |
| KR | 10-2094381 B1 | 3/2020 |

OTHER PUBLICATIONS

International Search Report of PCT Application No. PCT/KR2020/008181, dated Sep. 29, 2020 in 12 pages.
Office Action in corresponding Japanese Application No. 2022-502990 dated Jan. 17, 2023 and English machine translation.

* cited by examiner

COUPLING ASSEMBLY FOR CONNECTING PIPES, AND MANUFACTURING METHOD THEREFOR

TECHNICAL FIELD

The present invention relates to a coupling assembly for connecting pipes and a method of manufacturing the same, and more particularly, to a coupling assembly for connecting pipes in which, since couplers are installable while being temporarily assembled using fastening members and are not deformed during a fastening process, the couplers are stably fixed, and a method of manufacturing the coupling assembly.

BACKGROUND ART

Generally, in order to connect pipes continuously arranged along an axial direction, a pipe and a pipe are connected using a coupling.

The coupling includes a plurality of segments disposed along a circumferential direction of the pipe and connectable to each other. While the segments are arranged on an end of the pipe, the plurality of segments are fastened to each other using an additional fastening member so as to connect the continuous pipes.

Here, fastening grooves are formed on both ends of the pipe along the circumferential direction, and a part of the coupling is fastened while being inserted into the fastening groove. This is to support the pipe using the coupling so as not to allow the pipes that are continuous with each other to be separated even when a force is applied in a direction in which a gap between the pipes is increased by a pressure of a fluid in the pipes.

In the case of a conventional coupling, segments include an arch-shaped surface to be inserted into the fastening groove. Here, the fastening groove is formed to have a shape in which some of an outer circumferential surface of the pipe is recessed. Also, the segments are fastened while the arch-shaped surface of the segment is seated in the fastening groove. In order to stably fix the segments, a curvature radius of the arch-shaped surface is formed to be equal to a radius of an outer circumferential surface of the fastening groove.

However, due to a structural feature that a radius of the outer circumferential surface of the pipe is formed to be larger than the radius of the outer circumferential surface of the fastening groove, the arch surface of the segment is seated in the fastening groove using a method of moving each segment downward in a radial direction of the pipe while being disposed above the fastening groove and then the segments are fastened to each other using fastening members. When the segments are arranged and fastened as described above, it is necessary to fasten the segments using the fastening members while maintaining a state in which the plurality of segments are arranged. Accordingly, since it is difficult for a worker to perform the work alone, workability is degraded.

In order to improve this, Patent Document 1 discloses a configuration that improves workability by forming a curvature radius of an arch-shaped surface of a segment to be larger than a radius of an outer circumferential surface of a pipe. That is, since the curvature radius of the arch-shaped surface of the segment is formed to be larger than the radius of the outer circumferential surface of the pipe, the segment is movable in an axial direction of the pipe while being temporarily assembled using a fastening member so that the temporarily assembled segment may pass the outer circumferential surface of the pipe and move to a position at which a fastening groove is formed.

However, as described above, since the radius of the outer circumferential surface of the fastening groove is formed to be smaller than the radius of the outer circumferential surface of the pipe, in order to seat the arch-shaped surface of the segment on the outer circumferential surface of the fastening groove, Patent Document 1 discloses the segment which is deformable when the fastening member is tightened to allow a curvature radius of the arch-shaped surface to coincide with the radius of the outer circumferential surface of the fastening groove.

Couplings applied to construction sites are generally formed of a cast iron material. In consideration of embodying a complicated shape of such couplings as well as manufacturing costs thereof, couplings are produced through machined casting using cast iron.

However, when the segments formed of a cast iron material to have a structure like Patent Document 1 are fastened, due to properties of the cast iron having high carbon content, the segments are broken and damaged during a deformation process such that there is a limitation in application in actual practice.

Accordingly, it is urgent to solve the foregoing.

Patent Document 1: Korean Patent Publication No. 10-2007-0012723 (published on Jan. 26, 2007)

DISCLOSURE

Technical Tasks

The present invention is directed to providing a coupling assembly for connecting pipes in which, since couplers are installable while being temporarily assembled using fastening members and are not deformed in a fastening process, the couplers are stably fixable after fastening, and a method of manufacturing the coupling assembly.

Technical Solution

One aspect of the present invention provides a coupling assembly in which the pipes are connected in a state in which two or more couplers are disposed to face each other to connect pipes continuously arranged along an axial direction and fastening members are temporarily assembled with a plurality of such couplers. Here, a catch portion inserted into a fastening groove, which is formed in the pipe, and having an inner diameter with a size corresponding to an outer diameter of the fastening groove is formed in the coupler. Also, interference prevention grooves configured to prevent interference between the catch portion and the pipe are formed on both ends of the catch portion to allow an outer circumferential surface of the pipe to pass through a space between the couplers that are temporarily assembled.

An arch surface facing an outer circumferential surface of the fastening groove may be formed in the catch portion, and a first extension surface formed to extend outward in a radial direction from the arch surface may be formed in the interference prevention groove.

A second extension surface formed to extend downward from the first extension surface and having a curvature disposed concentrically with the arch surface may be formed in the interference prevention groove.

A rubber ring configured to prevent a fluid leakage may be provided between the pipe and the coupler. Here, an auxiliary support surface configured to support a side of the rubber ring to prevent the side of the rubber ring from protruding outward through the interference prevention groove when a water pressure is applied to the inside of the coupler may be formed on the interference prevention groove.

The auxiliary support surface may include a closed-curve-shaped cross section formed by the first extension surface, the second extension surface, and a connection surface configured to connect any one position on the first extension surface to another position on the second extension surface.

A position at which the arch surface and the first extension surface come into contact with each other may be formed within a range of more than 0° and less than or equal to 24° on the basis of a bottom surface of the coupler.

The position at which the arch surface and the first extension surface come into contact with each other may be formed within a range of more than or equal to 12° and less than or equal to 20° on the basis of the bottom surface of the coupler.

A rubber ring configured to prevent a fluid leakage may be provided between the pipe and the coupler. Here, a rear support surface configured to support and fix the rubber ring may be formed in the coupler, and deformation-allowable grooves extending outward in a radial direction may be formed on both ends of the rear support surface.

Reinforcing portions extending outward in the radial direction may be formed on both ends of an outer circumferential surface of the coupler.

Another aspect of the present invention provides a method of manufacturing a coupling assembly in which the pipes are connected in a state in which two or more couplers are disposed to face each other to connect pipes continuously arranged along an axial direction and fastening members are temporarily assembled with a plurality of such couplers. The method includes forming a catch portion having an inner diameter with a size corresponding to an outer diameter of the fastening groove in the coupler and forming interference prevention grooves configured to prevent interference between the catch portion and the pipe to allow an outer circumferential surface of the pipe to pass through a space between the couplers that are temporarily assembled on both ends of the catch portion.

The forming of the interference prevention grooves may include forming a first extension surface extending outward in a radial direction from an arch surface formed in the catch portion and forming a second extension surface extending downward from the first extension surface and having a curvature disposed concentrically with the arch surface.

The forming of the first extension surface may include forming the first extension surface so that a position at which the arch surface and the first extension surface come into contact with each other is within a range of more than 0° and less than or equal to 24° on the basis of a bottom surface of the coupler.

Advantageous Effects

According to a coupling assembly for connecting pipes which have the above components and a method of manufacturing the same, since two or more couplers are installable on the pipe while being temporarily assembled using fastening members, there is an advantage that workability is improved.

Also, since it is configured that the coupler is seated in a fastening groove formed in the pipe even when the coupler is not deformed in a process of fastening the coupler, the coupler may be stably fixed after fastening and appropriately satisfy a water pressure required for application to the field.

In addition, since the coupling assembly may be manufactured using a simple method, there is an advantage that a manufacturing property is improved.

EMBODIMENTS

Hereinafter, embodiments of the present invention will be described in detail to be implemented by one of ordinary skill in the art with reference to the drawings. The present invention may be implemented in a variety of shapes and will not be limited to the embodiments described herein. To clearly describe the present invention, a description of an irrelevant part will be omitted. Throughout the specification, like or similar components will be referred to as like reference numerals.

Throughout the specification, the terms "comprise," "have," or the like are used herein to specify the presence of implemented features, numbers, stages, operations, elements, components or combinations thereof but do not preclude the presence or addition of one or more other features, numbers, stages, operations, elements, components, or combinations thereof.

Figure 1:
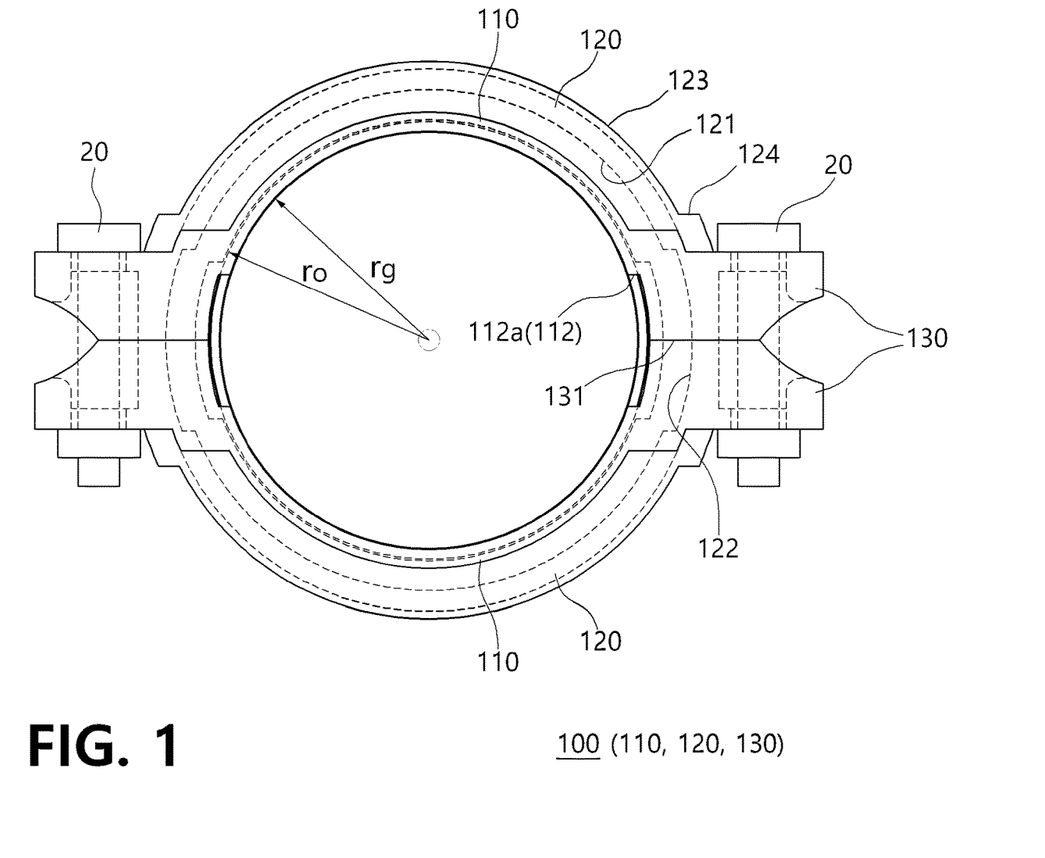
FIG. 1 is a front view illustrating a state in which a coupling assembly according to one embodiment of the present invention is fastened.
Figure 2:
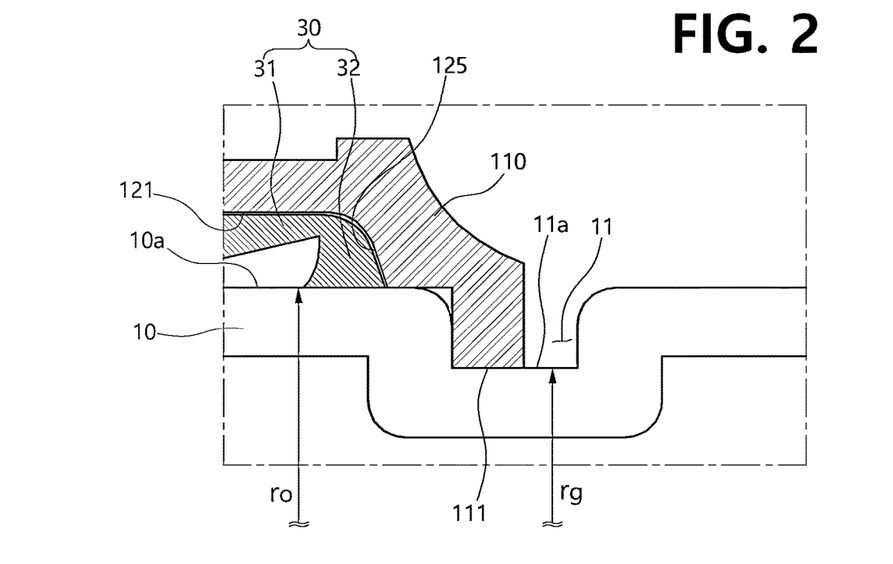
FIG. 2 is a cross-sectional view illustrating the state in which the coupling assembly according to one embodiment of the present invention is fastened.
Figure 3:
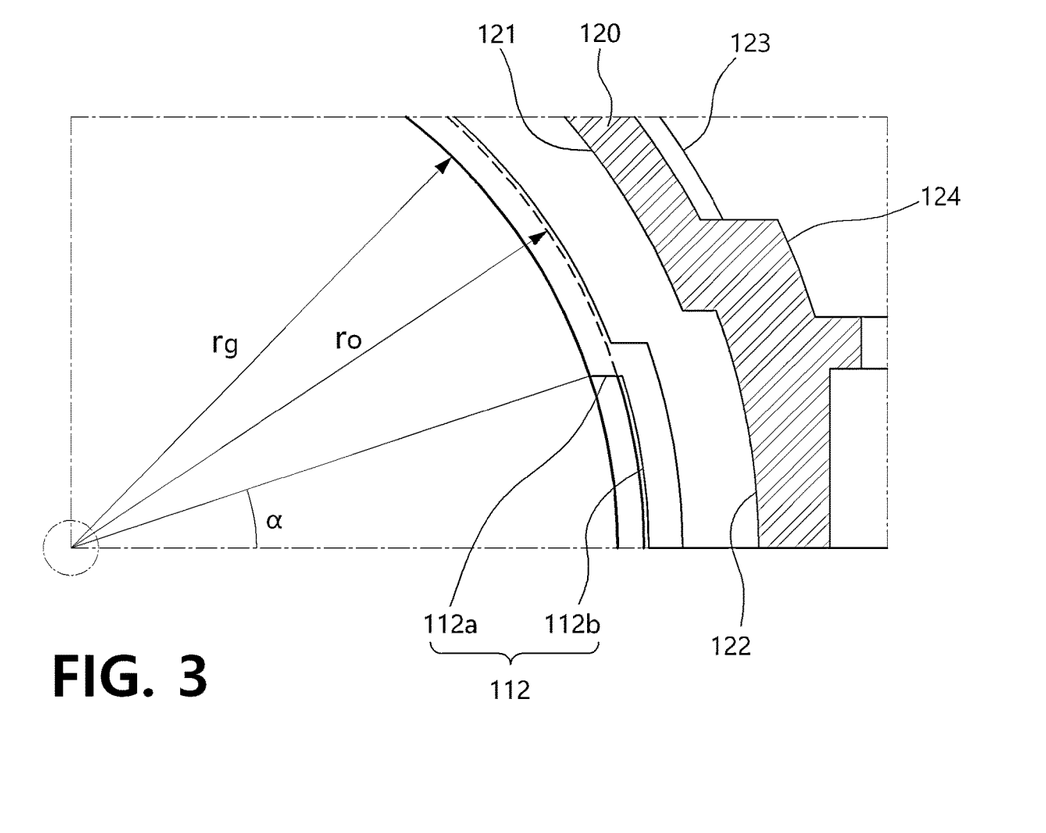
FIG. 3 is an enlarged cross-sectional view illustrating an interference prevention groove of the coupling assembly according to one embodiment of the present invention.
Figure 4:
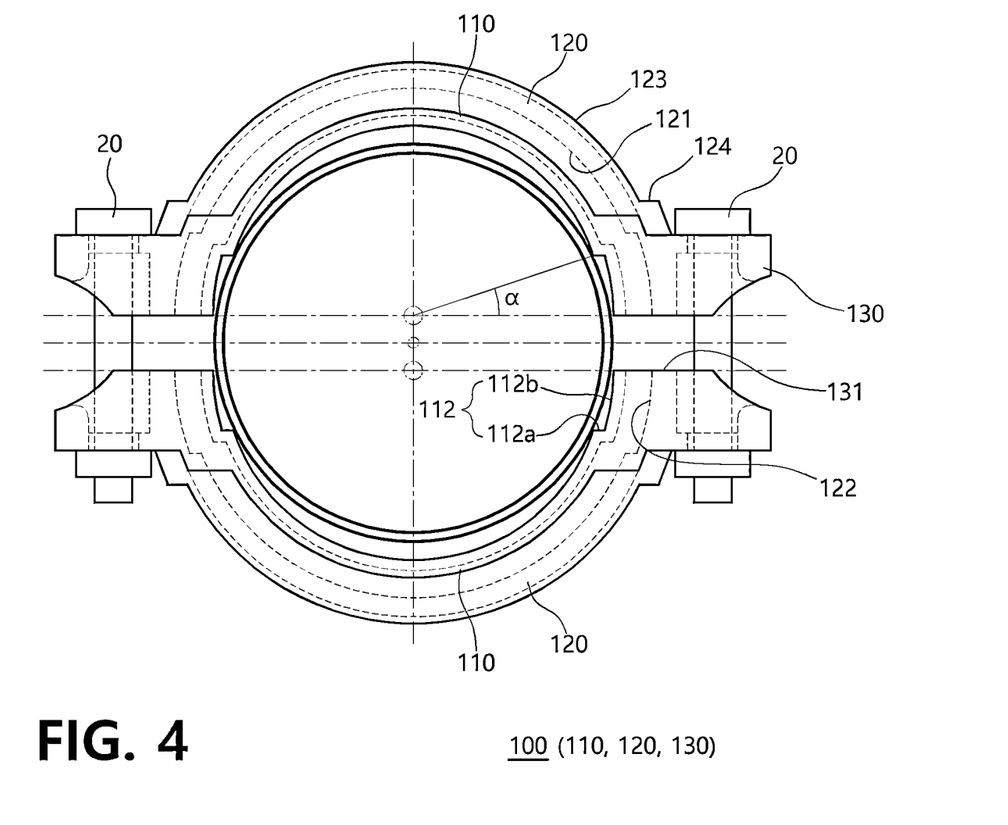
FIG. 4 is a front view illustrating a state before the coupling assembly according to one embodiment of the present invention is fastened.
Figure 5:
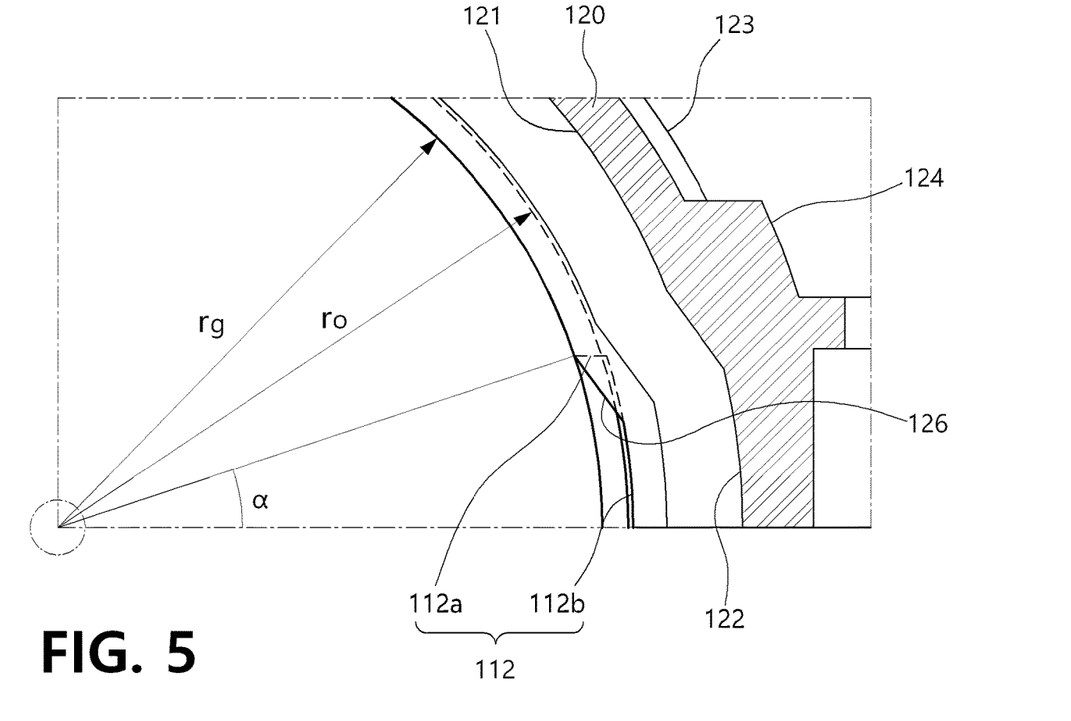
FIG. 5 is an enlarged cross-sectional view illustrating an interference prevention groove of a coupling assembly according to another embodiment of the present invention.
Figure 6:
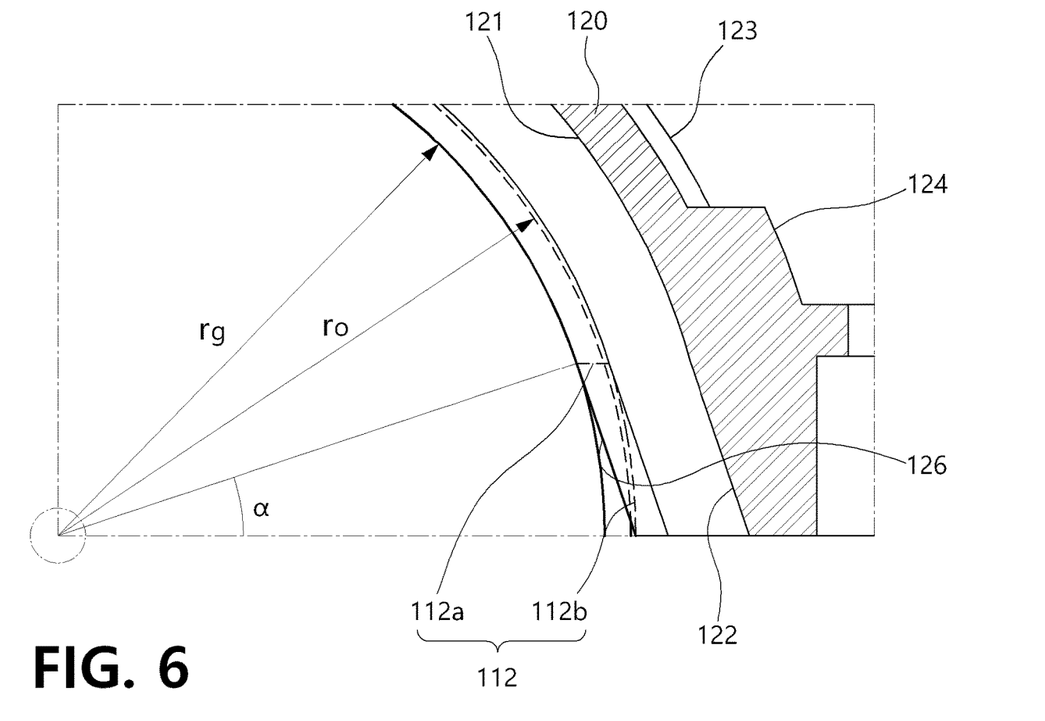
FIG. 6 is a front view illustrating a state before the coupling assembly according to another embodiment of the present invention is fastened.
Figure 7:
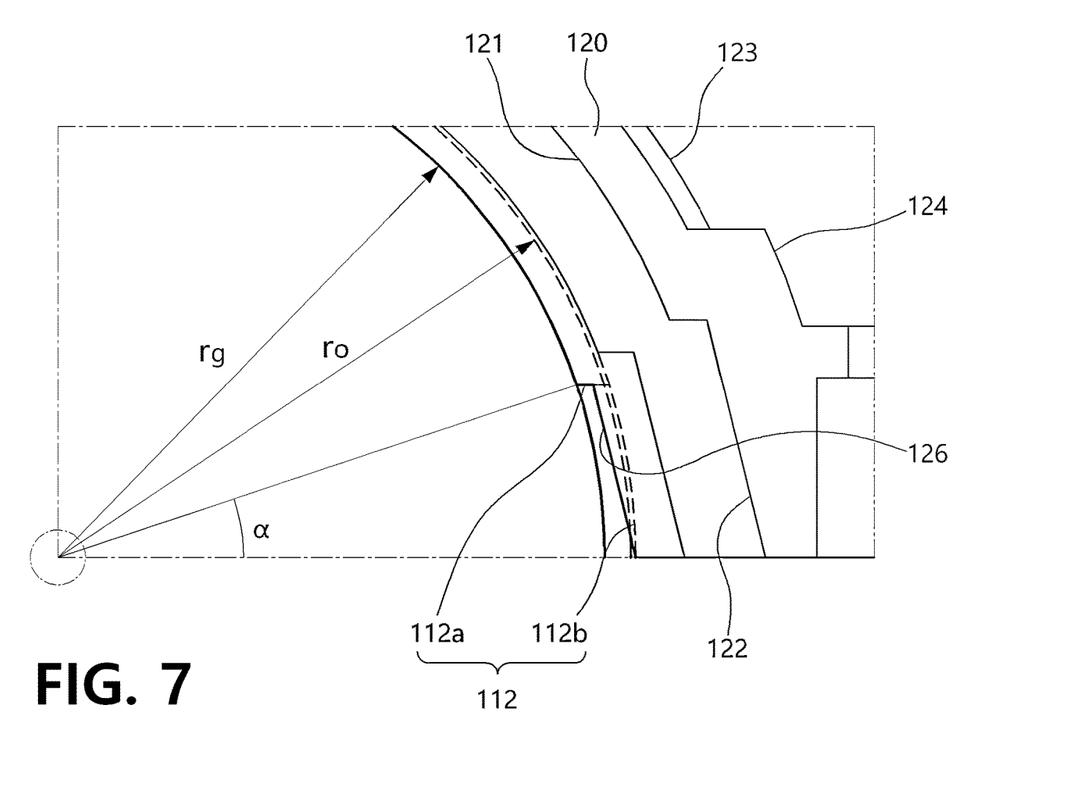
FIGS. 7 and 8 are enlarged cross-sectional views illustrating an interference prevention groove of a coupling assembly according to still another embodiment of the present invention.
Figure 8:
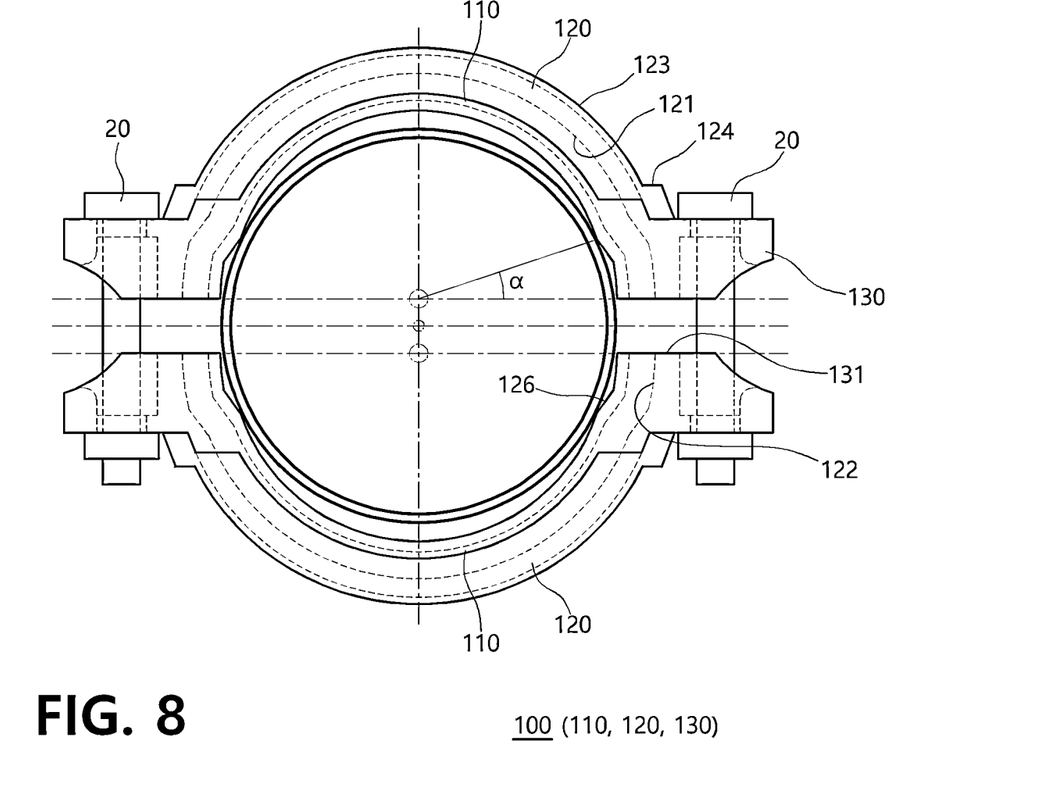
Figure 9:
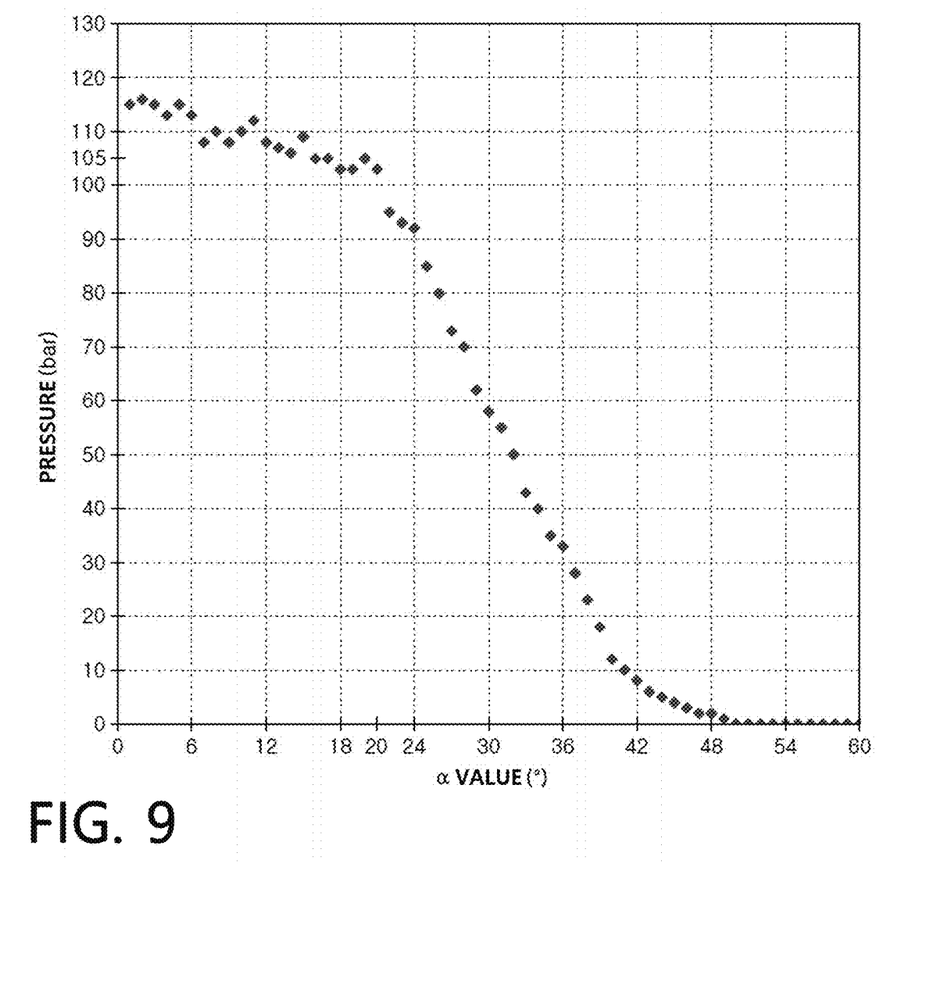
FIG. 9 is a performance graph illustrating a relationship of allowable water pressure according to a first extension surface forming position of the coupling assembly according to the present invention.
Figure 10:
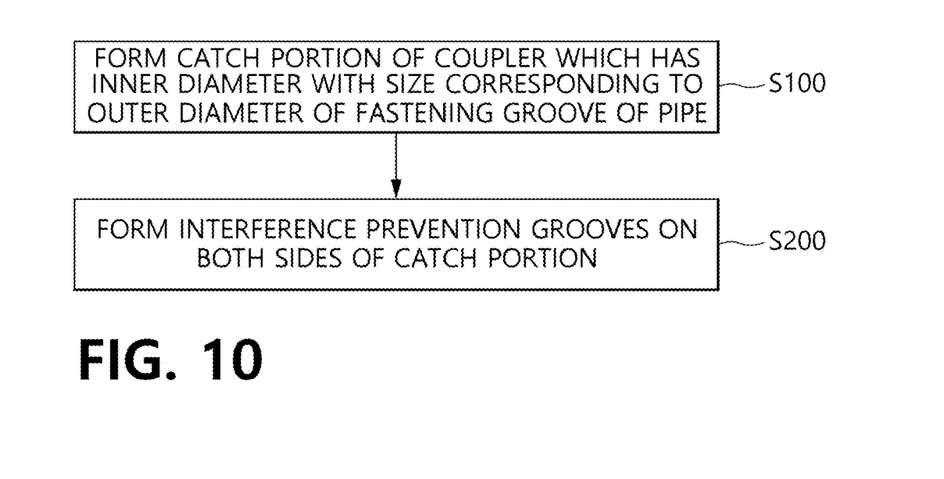
FIG. 10 is a flowchart illustrating a method of manufacturing the coupling assembly according to the present invention.

FIG. 1 is a front view illustrating a state in which a coupling assembly according to the present invention is fastened, FIG. 2 is a cross-sectional view illustrating the state in which the coupling assembly according to the present invention is fastened, FIG. 3 is an enlarged cross-sectional view illustrating an interference prevention groove of the coupling assembly according to the present invention, FIG. 4 is a front view illustrating a state before the coupling assembly according to the present invention is fastened, FIG. 5 is an enlarged cross-sectional view illustrating an interference prevention groove of a coupling assembly according to another embodiment of the present invention, FIG. 6 is a front view illustrating a state before the coupling assembly according to another embodiment of the present invention is fastened, FIGS. 7 and 8 are enlarged cross-sectional views illustrating an interference prevention groove of a coupling assembly according to still another embodiment of the present invention, FIG. 9 is a performance graph illustrating a relationship of allowable water pressure according to a first extension surface forming position of the coupling assembly according to the present invention, and FIG. 10 is a flowchart illustrating a method of manufacturing the coupling assembly according to the present invention.

As shown in FIGS. 1 and 2, the coupling assembly according to the present invention is configured to connect pipes 10 continuously arranged along an axial direction while two or more couplers 100 are disposed to face each other and fastening members 20 are temporarily assembled with a plurality of such couplers 100 to couple the pipes 10.

Here, the coupler 100 includes a catch portion 110 to be inserted into a fastening groove 11 formed in the pipe 10 while an inner diameter of the catch portion 110 has a size corresponding to an outer diameter of the fastening groove 11.

That is, when a distance from a center of the pipe 10 to an outer circumferential surface 10a of the pipe 10 is ro and a distance from the center of the pipe 10 to an outer circumferential surface 11a of the fastening groove 11 is rg, the inner diameter of the catch portion 110 is formed to have the size corresponding to the outer diameter of the fastening groove 11 so as to allow the catch portion 110 to be pressed against the outer circumferential surface 11a of the fastening groove 11. Here, the inner diameter of the catch portion 110 may be formed to be slightly greater than the outer diameter of the fastening groove 11. This is because the catch portion 110 is pressed against the fastening groove 11 outward in a radial direction. A difference between the inner diameter of the catch portion 110 and the outer diameter of the fastening groove 11 may be formed to be as much as the catch portion 110 may be pressed against the outer circumferential surface 11a of the fastening groove 11.

When configured as described above, the catch portion 110 is pressed against the outer circumferential surface 11a of the fastening groove 11 so as to secure structural stability.

However, when the catch portion 110 is configured to be pressed against the outer circumferential surface 11a of the fastening groove 11, the structural stability may be secured. However, in this way, when the plurality of couplers 100 are inserted into the outer circumferential surface 10a of the pipe 10 along an axial direction while being temporarily assembled by the fastening members 20, the catch portion 110 may be caught by the outer circumferential surface 10a of the pipe 10 such that the plurality of temporarily assembled couplers 100 may not be inserted.

Accordingly, in order to overcome the above limitation, as shown in FIGS. 3 and 4, interference prevention grooves 112 are formed on both sides of the catch portion 110. The interference prevention grooves 112 form a gap to allow the outer circumferential surface 10a of the pipe 10 to pass through between the temporarily couplers 100.

That is, since the catch portion 110 is pressed against the outer circumferential surface 11a of the fastening groove 11 so as to secure the structural stability and the interference prevention grooves 112 are formed on both sides of the catch portion 110 so a to install the pipe 10 to pass through in the axial direction while the couplers 100 are temporarily assembled, workability may be improved.

The coupler 100 includes one side catch portion 110 inserted into the fastening groove 11 formed in one side pipe 10, the other side catch portion 110 inserted into the fastening groove 11 formed in the other side pipe 10, and a body portion 120 configured to connect the one side catch portion 110 and the other side catch portion 110. Also, a rubber ring 30 having elasticity may be provided in a space formed by the body portion 120 and the catch portion 110 to prevent a leakage of a fluid flowing through the pipe 10.

Also, the coupler 100 includes a fastening portion 130 through which the fastening member 20 passes. The fastening members 20 pass through and are simultaneously fastened to the fastening portions 130 formed in the couplers 100 facing each other. When the couplers 100 are disposed in the correct position as described above, before fastening through the fastening members 20, a worker checks out whether the couplers 100 are fastened normally by moving the couplers 100 disposed to face each other in parallel in a radial direction of the pipe 10 so that bottom surfaces 131 formed in the fastening portions 130 come into contact with each other. Here, the couplers 100 are formed so that the bottom surfaces 131 formed in the fastening portions 130 come into contact with each other without additional deformation.

When the continuously disposed pipes 10 and the temporarily assembled couplers 100 are installed in the correct position, fastening forces are applied using the fastening members 20. When the fastening forces are applied as described, the couplers 100 disposed to face each other are moved in parallel in the radial direction of the pipes 10 and the fastening portions 130 formed in the couplers 100 come into contact with the pipe 10 such that the couplers 100 do not move any more. Here, fastening torque of a certain degree is applied to the fastening members 20. Here, since the inner diameter of the catch portion 110 is formed to be slightly greater than the outer diameter of the fastening groove 11 so that the catch portion 110 is pressed against the outer circumferential surface 11a of the fastening groove 11, deformation does not occur in the couplers 100 during a process in which the fastening portions 130 formed in the couplers 100 come into contact with the pipe 10.

In addition, when the couplers 100 are moved in parallel in the radial direction of the pipes 10 as described above, the catch portion 110 formed in the coupler 100 is inserted into the fastening groove 11 and then supports the pipe 10 in not breaking in an axial direction due to a fluid pressure in the pipe 10.

Here, as shown in FIG. 3, the catch portion 110 may include an arch surface 111 facing the outer circumferential surface 11a of the fastening groove 11, and the interference prevention groove 112 may include a first extension surface 112a formed to extend outward in the radial direction from the arch surface 111.

That is, since the first extension surface 112a extends outward in the radial direction from the arch surface 111, it is easy to secure a gap between the catch portion 110 and the outer circumferential surface 10a of the pipe 10.

Also, the interference prevention groove 112 may include a second extension surface 112b extending downward from the first extension surface 112a and having a curvature disposed concentrically with the arch surface 111.

That is, while the first extension surface 112a is formed to extend outward in the radial direction, the second extension surface 112b is formed to additionally extend from the first extension surface 112a such that as much of a gap is secured between the catch portion 110 and the outer circumferential surface 10a of the pipe 10 as a part where the first extension surface 112a and the second extension surface 112b are formed.

Here, the second extension surface 112b is formed to have a curvature disposed concentrically with the arch surface 111. When the second extension surface 112b has the curvature disposed concentrically with the arch surface 111 as described above, the second extension surface 112b may be disposed concentrically with the outer circumferential surface 11a of the fastening groove 11 formed in the pipe 10 and the outer circumferential surface 10a of the pipe 10. When the second extension surface 112b is located further out than the outer circumferential surface 10a of the pipe 10 in the radial direction and disposed to be spaced apart from an outer circumferential surface of the pipe 10, the worker may easily see with the naked eye whether the catch portion 110 is stably pressed against the outer circumferential surface 11a of the fastening groove 11 through an arrangement state of the outer circumferential surface 10a of the pipe 10 and the second extension surface 112b.

In addition, the first extension surface 112a may have a length that allows the second extension surface 112b to be located further out than the outer circumferential surface 10a of the pipe 10 in the radial direction.

Also, the rubber ring 30 configured to prevent a fluid leakage is provided between the pipe 10 and the coupler 100, and as shown in FIG. 2, a rear support surface 121 configured to support and fix a rear surface 31 of the rubber ring 30 and a side support surface 125 configured to support and fix a side 32 of the rubber ring 30 are formed in the coupler 100.

Here, as shown in FIGS. 5 and 6, an auxiliary support surface 126 configured to support a side of the rubber ring 30 to prevent the side 32 of the rubber ring 30 from protruding outward through the interference prevention groove 112 when a water pressure is applied to the inside of the coupler 100 may be formed on the interference prevention groove 112.

That is, when a pressure of 100 bars or more is applied to the inside of the coupler 100, the side of the rubber ring 30 may be damaged while protruding outward through the interference prevention groove 112 formed by the first extension surface 112a and the second extension surface 112b. However, when the side support surface 125 configured to support the side 32 of the rubber ring 30 is formed on the interference prevention groove 112 as described above, it is possible to stably prevent the side 32 of the rubber ring 30 from protruding so as to prevent a fluid leakage without damage to the rubber ring 30.

The auxiliary support surface 126 may include a closed-curve-shaped cross section formed by the first extension surface 112a, the second extension surface 112b, and a connection surface 112c configured to connect any one position on the first extension surface 112a to another position on the second extension surface 112b.

That is, since the auxiliary support surface 126 has the closed-curve-shaped cross section formed by the first extension surface 112a, the second extension surface 112b, and the connection surface 112c, when the water pressure is applied, the auxiliary support surface 126 may support the side 32 of the rubber ring 30 so as to effectively prevent the rubber ring 30 from protruding outward through the interference prevention groove 112.

The connection surface 112c connects any one position on the first extension surface 112a to another position on the second extension surface 112b, that is, as shown in FIG. 5, the connection surface 112c may be configured to connect one end of the first extension surface 112a to any one position on the second extension surface 112b.

Particularly, while the connection surface 112c connects any one position on the second extension surface 112b, when a position between one end of the second extension surface 112b and the other end of the second extension surface 112b is connected, as shown in FIG. 5, the second extension surface 112b is formed after the connection surface 112c. When configured as described above, through an arranged state of the outer circumferential surface 10a of the pipe 10 and the second extension surface 112b, the worker may easily see, with the naked eye, whether the catch portion 110 is stably pressed against the outer circumferential surface 11a of the fastening groove 11.

Alternatively, the connection surface may be configured to connect one end of the first extension surface 112a to the other end of the second extension surface 112b as shown in FIG. 7 or to connect any one position on the first extension surface 112a to the other end of the second extension surface 112b as shown in FIG. 8. When the auxiliary support surface 126 is formed as described above, the side 32 of the rubber ring 30 may be supported by closing a certain region of the interference prevention groove 112.

In addition, the auxiliary support surface 126 may be formed to extend outward in a radial direction on the basis of the connection surface 112c to prevent interference with the outer circumferential surface 10a of the pipe 10 when the coupler 100 is temporarily assembled and then the pipe 10 is fastened.

Here, since the arch surface 111 of the catch portion 110 and the outer circumferential surface 11a of the fastening groove 11 are spaced apart from each other at a part where the first extension surface 112a is formed, the catch portion 110 may not support the pipe 10 at this part. This means that a water pressure supportable by the coupler 100 is reduced by forming the first extension surface 112a. Accordingly, the first extension surface 112a may be formed within a range satisfying an allowable water pressure after the coupler 100 is fastened. A position for forming the first extension surface 112a determines whether the couplers 100 are easily insertable into the pipe 10 in the axial direction when the couplers 100 are installed in the pipe 10 while being temporarily assembled as well as whether it is possible to effectively support a force applied in a direction in which an interval between the mutually continuous pipes 10 increases due to a pressure of a fluid inside the pipe 10. Accordingly, it is necessary to cautiously determine the position for forming the first extension surface 112a.

When an angle formed on the basis of the position for forming the first extension surface 112a, that is, the bottom surface 131 of the coupler 100 to a position at which the arch surface 111 and the first extension surface 112a come into contact with each other, is defined as α, as shown in FIG. 9, it may be seen that the allowable water pressure increases as the first extension surface 112a is formed at a lower angle. That is, the position for forming the first extension surface 112a and the allowable water pressure are inversely proportional to each other.

Also, as the angle at which the first extension surface 112a is formed increases, the allowable water pressure is reduced. Since the allowable water pressure is rapidly reduced when the angle exceeds 24°, the angle may be formed to be less than or equal to 24°.

In addition, generally, as representative criteria related to the coupler 100 for connecting the pipe 10, there are U.S. Underwriter Laboratories (UL) criteria. According to UL criteria, it is defined that the coupler 100 for connecting the pipe 10 should endure a water pressure corresponding to five times a used water pressure.

That is, since a water pressure used in a building is generally 21 bars, according to UL criteria, it is necessary to be able to minimally endure 105 bars.

Accordingly, when the allowable water pressure of the coupler 100 is checked while changing the angle at which the first extension surface 112a is formed, as shown in FIG. 9, since the allowable water pressure of the coupler 100 does not satisfy U.S. UL criteria when the angle at which the first extension surface 112a is formed exceeds 20°, the first extension surface 112a may be formed at a position where a is 20° or less.

Here, although the allowable water pressure increases as the first extension surface 112a is formed at a lower angle, it becomes difficult to install the coupler 100 on the pipe 10 while the coupler 100 is being temporarily assembled as the first extension surface 112a is formed at a lower angle. Accordingly, it is necessary to form the first extension surface 112a at a minimum position at which the coupler 100 is installable on the pipe 10 while being temporarily assembled or at least at a position higher than the position.

A process of deriving a minimum value of α is as follows.

First, when the coupler 100 is moved downward from above the outer circumferential surface 10a of the pipe 10, a curvature radius of the arch surface 111 of the catch portion 110 is formed to be smaller than a curvature radius ro of the outer circumferential surface 10a of the pipe 10 so that the catch portion 110 is not moved downward any more while surrounding a part of the outer circumferential surface 10a of the pipe, and a height of the coupler 100 is fixed to the position.

That is, while the height of the coupler 100 is fixed as described above, another part of the pipe 10 being located perpendicularly below both ends of the coupler 100 means a part that is not insertable into the coupler 100 due to a greater curvature radius ro of the outer circumferential surface 10a of the pipe 10.

Accordingly, it is necessary to form the interference prevention groove 112 to allow the other part of the pipe 10 which is not insertable into the coupler 100 to be inserted into the coupler 100. Here, an angle formed by a line extending from a center of the pipe 10 to one end of the coupler 100 with the fixed height and a horizontal line passing through the center of the pipe 10 becomes a minimum value of α. Also, the minimum value of α, which is derived from the above process, is 12°.

Eventually, the angle of a may be formed within a range of 12° to 20°.

As described above, the rubber ring 30 configured to prevent a fluid leakage is provided between the pipe 10 and the coupler 100, and the rear support surface 121 configured to support and fix the rear surface 31 of the rubber ring 30 and the side support surface 125 configured to support and fix the side 32 of the rubber ring 30 are formed in the coupler 100.

That is, when the coupler 100 is assembled using the fastening member 20 while the rubber ring 30 is disposed between the pipe 10 and the coupler 100, the rubber ring 30 is pushed by the coupler 100 and pressurizes the outer circumferential surface 10a of the pipe 10. The rubber ring 30 prevents a fluid leakage while being pushed. Here, when the rubber ring 30 is elastically deformed while being adequately pressurized according to design specifications, the fluid leakage is effectively prevented. However, when deformation occurs in the rubber ring 30 due to a pressure beyond the design specifications while the rubber ring 30 is pressurized, a part where the rubber ring 30 and the pipe 10 come into contact with each other may leak a fluid due to the excessive deformation.

Accordingly, when the deformation occurs in the rubber ring 30 due to the pressure beyond the design specifications while the rubber ring 30 is pushed by the coupler 100, so as not to pressurize the outer circumferential surface 10a of the pipe 10 even when the rubber ring 30 is pushed by the coupler 100, deformation-allowable grooves 122 are formed on both ends of the rear support surface 121 to extend outward in a radial direction.

That is, when a pressure according to the design specifications is applied to the rubber ring 30, the rubber ring 30 is elastically deformed and pressurizes the outer circumferential surface 10a of the pipe 10. However, the rubber ring 30 is configured to be deformed outward in the radial direction along the deformation-allowable groove 122 and not to pressurize the outer circumferential surface 10a of the pipe 10 any more when the pressure beyond the design specifications is applied to the rubber ring 30 and thus a fluid leakage caused by excessive deformation of the rubber ring 30 may be solved.

Also, a frictional force acts between the rear support surface 121 and an outer circumferential surface of the rubber ring 30 in a process of assembling the coupler 100. Particularly, a great frictional force acts on parts of the rear support surface 121 formed to be adjacent to both ends of the coupler 100. Accordingly, as the rubber ring 30 is pressurized while being pushed along a direction in which the coupler 100 is assembled due to the frictional force, excessive deformation of the rubber ring 30 occurs and thus a fluid leakage may be present. However, when the deformation-allowable grooves 122 extending outward in the radial direction from both ends of the rear support surface 121 are formed, since both ends of the rear support surface 121 are spaced apart from the outer circumferential surface of the rubber ring 30, a problem of the excessive deformation of the rubber ring 30 caused by the frictional force may be solved.

Here, as shown in FIGS. 3 and 4, reinforcing portions 124 extending outward in the radial direction may be formed on both ends of an outer circumferential surface 123 of the body portion 120 of the coupler 100.

As described above, when the deformation-allowable grooves 122 extending outward in the radial direction from the rear support surface 121 are formed, a thickness of the body portion 120 of the coupler 100 is reduced and thus a problem may occur in durability. Accordingly, to prevent this, the reinforcing portions 124 are formed on the outer circumferential surface 123 of the body portion 120 of the coupler 100 to extend outward in the radial direction.

Also, as shown in FIG. 10, a method of manufacturing the coupling assembly according to the present invention, in which the pipes 10 are connected while the two or more couplers 100 are disposed to face each other to connect the pipes 10 continuously arranged along an axial direction and the fastening members 20 are temporarily assembled with a plurality of such couplers 100, includes forming the catch portion 110 having an inner diameter with a size corresponding to an outer diameter of the fastening groove 11 formed in the pipe 10 in the coupler 100 (S100) and forming the interference prevention groove 112 configured to prevent interference between the catch portion 110 and the pipe 10 to allow an outer circumferential surface of the pipe 10 to pass through a space between the couplers 100 temporarily assembled with both sides of the catch portion 110.

That is, the catch portion 110 having the inner diameter with the size corresponding to the outer diameter of the fastening groove 11 formed in the pipe 10 is formed in the coupler 100 and pressed against the outer circumferential surface 11a of the fastening groove 11 so as to secure structural stability.

However, when the catch portion 110 is configured to be pressed against the outer circumferential surface 11a of the fastening groove 11, the structural stability may be secured. However, when the plurality of couplers 100 are inserted into the outer circumferential surface 10a of the pipe 10 along an axial direction while being temporarily assembled by the fastening members 20, the catch portion 110 may be caught by the outer circumferential surface 10a of the pipe 10 such that the plurality of temporarily assembled couplers 100 may not be inserted. Accordingly, the interference prevention groove 112 configured to prevent interference between the catch portion 110 and the pipe 10 is formed to allow the outer circumferential surface of the pipe 10 to pass through the space between the couplers 100 temporarily assembled with both ends of the catch portion 110.

Here, the forming of the interference prevention groove 112 (S200) may include forming the first extension surface 112a formed to extend outward in the radial direction from the arch surface 111 formed in the catch portion 110, forming the second extension surface 112b formed to extend downward from the first extension surface 112a, having a curvature disposed concentrically with the arch surface 111, and located radially further outward than the outer circumferential surface of the pipe 10 to be spaced apart therefrom while being disposed concentrically with the outer circumferential surface of the pipe 10, and forming the auxiliary support surface 126 configured to support the side 32 of the rubber ring 30 to prevent the side 32 of the rubber ring 30 from protruding outward through the interference prevention groove 112 when the water pressure is applied to the inside of the coupler 100.

That is, when the first extension surface 112a extends outward in the radial direction from the arch surface 111, it is easy to secure a gap between the catch portion 110 and the outer circumferential surface 10a of the pipe 10.

Also, the second extension surface 112b extending downward from the first extension surface 112a and having a curvature disposed concentrically with the arch surface 111 is formed.

That is, while the first extension surface 112a is formed to extend outward in the radial direction, the second extension surface 112b is formed to additionally extend from the first extension surface 112a such that as much of a gap is secured between the catch portion 110 and the outer circumferential surface 10a of the pipe 10 as a part where the first extension surface 112a and the second extension surface 112b are formed.

In addition, the forming of the first extension surface 112a is forming the first extension surface 112a so that a position at which the arch surface 111 and the first extension surface 112a come into contact with each other is formed within a range of 12° to 20° on the basis of the bottom surface 131 of the coupler 100. When the first extension surface 112a is formed as described above, the coupler 100 is installable on the pipe 10 while being temporarily assembled and an allowable water pressure required by UL criteria may be satisfied.

When the coupling assembly is manufactured as described above, the coupling assembly may be manufactured using a simple method so as to improve manufacturing properties.

Although the embodiments of the present invention have been described above, the concept of the present invention is not limited to the embodiment disclosed herein and it should be understood that one of ordinary skill in the art who understands the concept of the present invention may easily provide other embodiments through addition, changes, elimination, and the like of components without departing from the scope of the same concept which will be included in the scope of the concept of the present invention.

The invention claimed is:

1. A coupling assembly for connecting pipes, the coupling assembly comprising:
two or more couplers disposed to face each other to connect the pipes continuously arranged along an axial direction; and
fasteners configured to assemble the two or more couplers,
wherein each of the two or more couplers comprises:
a catch portion configured to be inserted into a fastening groove, which is formed in a first one of the pipes, and having a size corresponding to an outer diameter of the fastening groove, and
interference prevention grooves configured to prevent interference between the catch portion and the first pipe and formed on both ends of the catch portion to allow an outer circumferential surface of the first pipe to pass through a space between the two or more couplers that are temporarily assembled,
wherein the catch portion comprises an arch surface facing an outer surface of the fastening groove,
wherein each interference prevention groove comprises:
a first extension surface formed to extend outward in a radial direction from the arch surface, and
a second extension surface formed to extend downward from the first extension surface and having a curvature disposed concentrically with the arch surface,
wherein the coupling assembly further comprises a rubber ring configured to prevent a fluid leakage and provided between the first pipe and at least one of the two or more couplers,
wherein each interference prevention groove comprises an auxiliary support surface configured to support a side of the rubber ring to prevent the side of the rubber ring from protruding outward through each interference prevention groove when a water pressure is applied to an inside of the two or more couplers, and
wherein the second extension surface is disposed to be spaced apart from the outer circumferential surface of the first pipe in a state of being disposed concentrically with the outer circumferential surface of the first pipe and is located further out than the outer circumferential surface of the first pipe in the radial direction.

2. The coupling assembly of claim 1, wherein the auxiliary support surface comprises a closed-curve-shaped cross section formed by the first extension surface, the second extension surface, and a connection surface configured to connect any one position on the first extension surface to another position on the second extension surface.

3. The coupling assembly of claim 1, wherein a position at which the arch surface and the first extension surface come into contact with each other is formed within a range of more than 0° and less than or equal to 24° based on a bottom surface of each coupler.

4. The coupling assembly of claim 1, wherein a position at which the arch surface and the first extension surface come into contact with each other is formed within a range from 12° to 20° based on a bottom surface of each coupler.

5. The coupling assembly of claim 1, wherein each coupler further comprises:
   a rear support surface configured to support and fix a rear surface of the rubber ring, and
   deformation allowing grooves extending outward in a radial direction and formed on both ends of the rear support surface.

6. The coupling assembly of claim 5, wherein each coupler comprises an outer circumference surface and reinforcing portions extending outward in the radial direction and formed on both ends of the outer circumference surface.

7. A method of manufacturing a coupling assembly for connecting pipes, wherein the coupling assembly comprises two or more couplers disposed to face each other to connect the pipes continuously arranged along an axial direction and fasteners configured to assemble the two or more couplers, the method comprising:
   forming a catch portion of each coupler, the catch portion having a size corresponding to an outer diameter of a fastening groove of a first one of the pipes; and
   forming interference prevention grooves on both ends of the catch portion of each coupler, the interference prevention grooves being configured to prevent interference between the catch portion and the first pipe to allow an outer circumferential surface of the first pipe to pass through a space between the two or more couplers that are temporarily assembled,
   wherein the forming of the interference prevention grooves comprises:
      forming a first extension surface extending outward in a radial direction from an arch surface formed in the catch portion,
      forming a second extension surface extending downward from the first extension surface and having a curvature disposed concentrically with the arch surface and being disposed to be spaced apart from the outer circumferential surface of the first pipe in a state of being disposed concentrically with the outer circumferential surface of the first pipe and is located further out than the outer circumferential surface of the first pipe in the radial direction, and
      forming an auxiliary support surface configured to support a side of a rubber ring to prevent the side of the rubber ring from protruding outward through one of the interference prevention grooves when a water pressure is applied to an inside of the two or more couplers that are assembled.

8. The method of claimer 7, wherein the forming of the first extension surface includes forming the first extension surface so that a position at which the arch surface and the first extension surface come into contact with each other is within a range of more than 0° and less than or equal to 24° based on a bottom surface of each coupler.

* * * * *